March 23, 1965     S. W. BRIGGS     3,174,625

FILTER

Filed Dec. 12, 1961

*INVENTOR.*
SOUTHWICK W. BRIGGS
BY
Raymond Wheaton
ATTORNEY

United States Patent Office 3,174,625
Patented Mar. 23, 1965

3,174,625
FILTER
Southwick W. Briggs, Chevy Chase, Md. (% Stone Filter Corporation, 900 Franklin St. NW., Washington, D.C.)
Filed Dec. 12, 1961, Ser. No. 158,761
5 Claims. (Cl. 210—493)

This invention relates to a filter, and particularly to a pleated paper filter adapted to withstand relatively high pressures without collapsing.

One of the great difficulties encountered with pleated paper filters under relatively high pressure conditions has been the impossibility of maintaining their flow capabilities for any appreciable time following the application of the pressures. Corrugated filter elements have been tried, but they soon collapse where the pressure differential assumes a value of the order of 20 lbs. per square inch or higher. Moreover, pleated paper filters of the types previously known have become deformed at their discharge edges to a degree that blocks the fluid flow through the radial openings formed in their supporting cores.

It is among the objects of the present invention to provide a filter comprising a resin impregnated paper element having pleats providing inlet edges and discharge edges, and having a discharge surface containing spaced grooves with intervening substantially flat lands. The grooves may have their bottom walls coated with a reinforcing material, impervious to oil, in the form of a thermosetting resin such as a phenolic resin. The entire discharge surface of the filter element may be coated with such a material prior to the formation of the grooves so that after embossing, the bottoms of the grooves will bear such a coating as well as the lands.

It is also contemplated that the discharge edges of the pleats be coated with such materials to impart rigidity thereto even under relatively high pressure conditions so that there is no great tendency to clog the openings formed in the core abutting these edges.

A more complete understanding of the invention will follow from a description of the accompanying drawings wherein.

Figure 7:
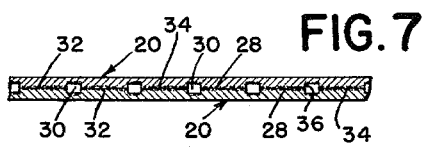
FIG. 7 is a sectional elevation taken along line 7—7 of FIG. 6.
Figures 6, 8:
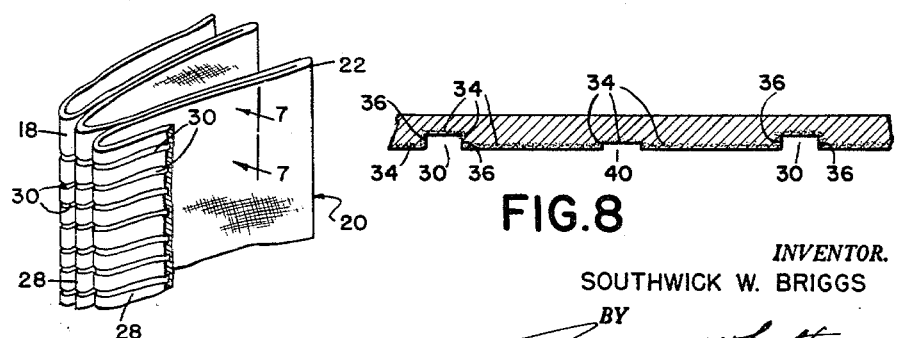
FIG. 6 is a fragmentary perspective view showing a portion of a pleated element under operating pressure conditions.
FIG. 8 is a fragmentary sectional elevation of a filter element embossed to form grooves of different depths.

The filter 10 depicted in the drawings comprises a hollow cylindrical core 12 containing radial perforations 14 whose outer wall 16 supports the discharge edges 18 of the pleated element 20 whose inlet edges 22 are engaged by the cover 24 containing bands of perforations 26 through which the material to be filtered passes toward the pleated element 20. As depicted in FIG. 6, the discharge surface 28 of the element 20 is embossed to provide grooves 30 extending radially of the filter and substantially parallel with one another so that the grooves formed in the proximate surfaces of the pleats will lie in registry as shown in FIG. 7. As will also be evident from FIG. 7, the lands 32 between the grooves are substantially flat and are wider than the grooves themselves so as to provide large supporting areas which will be substantially unyielding under the elevated pressures to which the filters are subjected. Since the grooves 30 are preferably formed by an embossing operation, the paper will be compacted in those areas to provide added strength.

Prior to the embossing operation, the discharge surface of the filter element may be coated with a reinforcing material 34 impervious to hot oil such as a phenolic resin or other suitable thermosetting resin. Then when the embossing operation produces the grooves 30, the coating will cover the bottom walls of the grooves as well as the lands 32, permitting the material to be filtered to pass through the side walls 36 of the grooves.

Figure 1:
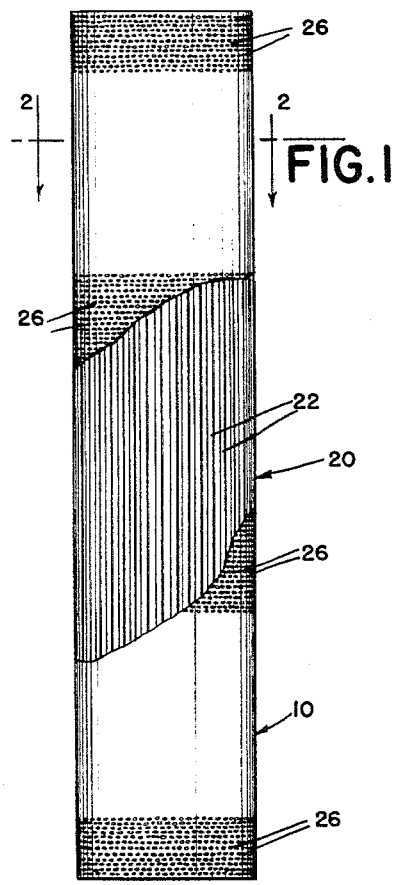
FIG. 1 is an elevation, partially broken away depicting a filter embodying the present invention.
Figure 2:
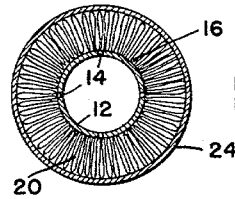
FIG. 2 is a cross section view taken along line 2—2 of FIG. 1.
Figure 3:
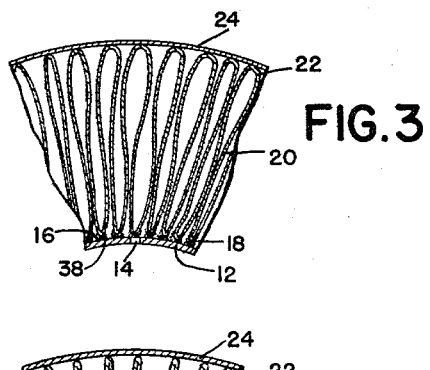
FIG. 3 is a fragmentary cross section on an enlarged scale depicting the pleated paper filter before it is subjected to pressure.
Figure 4:
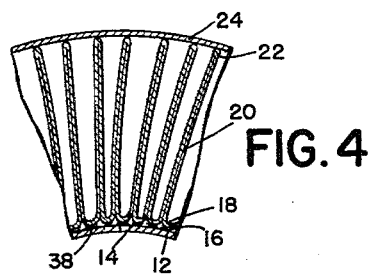
FIG. 4 is a fragmentary cross sectional view similar to FIG. 3 depicting the condition of the pleats under operating pressure conditions.
Figure 5:
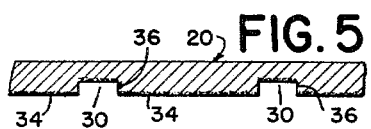
FIG. 5 is a fragmentary sectional elevation of a filter element embossed in accordance with the present invention.

As depicted in FIGS. 3 and 4, the discharge edges 18 of the pleats may also be coated with a reinforcing material 38 such as a phenolic resin or other thermosetting resin to rigidify these edges so that they will not become deformed and obstruct the openings 14 in the central core 12.

By virtue of this construction, the filter element will not collapse under differential pressures of the order of 20 to 25 lbs. per square inch and will retain their full flow characteristics much longer than elements of the ordinary corrugated form. By varying the depths of the grooves, results can be achieved which would otherwise require the combination of different types of corrugated stock where conventional filters are used. In accordance with the present invention, 2½–3 second paper can be employed to obtain various types of filters such as full flow filters (2½–5 seconds), semi-full flow filters (6–10 seconds), or shunt filters (12–30 seconds.)

Where the thermosetting resin contemplated is applied to portions of the discharge surface of the filter element in the form of a continuous layer, such portions become impervious to hot oil. Where it is applied in sufficiently dilute form to coat the individual fibers of the filter medium without bridging the voids between them, permeability of the medium will be retained. Accordingly, in its dilute form the coating can be applied to the side walls 36 of the grooves also, as depicted in FIG. 8. This embodiment of the invention also illustrates the use of grooves of different depths to achieve results that would otherwise require the use of many varieties of filter media. Alternate grooves have been shown as having different depths, the grooves 30 being somewhat deeper than the groove 40 lying between them. Thus it will follow that from a single stock, an infinite variety of media can be produced by varying the arrangement of grooves.

As will be understood by those skilled in the art, the cover member 24 and the core 12 may also be, but not necessarily, formed of paper impregnated with a resinous material such as a thermosetting phenolic condensation product.

Whereas the present invention has been described with reference to a limited number of embodiments, variations that will suggest themselves to those skilled in the art are contemplated within the scope of the appended claims.

I claim:
1. A filter comprising a resin impregnated paper element having pleats providing inlet edges and discharge edges, and having a discharge surface containing compacted portions defining spaced grooves with intervening substantially flat lands, said grooves having bottom walls impervious to oil.

2. A filter according to claim 1 wherein said grooves have their bottom walls coated with a thermosetting resin.

3. A filter according to claim 1 wherein said discharge surface is coated with a thermosetting resin.

4. A filter according to claim 1 wherein said discharge edges are coated with a thermosetting resin.

5. A filter according to claim 1 wherein said lands are wider than said grooves.

References Cited by the Examiner

UNITED STATES PATENTS

| 3,061,107 | 10/62 | Taylor | 210—506 X |
| 3,125,515 | 3/64 | Gruner et al. | 210—493 |

FOREIGN PATENTS

| 725,066 | 3/55 | Great Britain. |
| 827,362 | 2/60 | Great Britain. |

REUBEN FRIEDMAN, *Primary Examiner.*

HERBERT L. MARTIN, *Examiner.*